United States Patent
Ma et al.

(10) Patent No.: US 12,464,501 B2
(45) Date of Patent: Nov. 4, 2025

(54) SYSTEM AND METHOD FOR SENDING DATA

(71) Applicant: ZTE CORPORATION, Guangdong (CN)

(72) Inventors: Yihua Ma, Shenzhen (CN); Zhifeng Yuan, Shenzhen (CN); Zhigang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 454 days.

(21) Appl. No.: 17/858,630

(22) Filed: Jul. 6, 2022

(65) Prior Publication Data

US 2023/0040888 A1    Feb. 9, 2023

Related U.S. Application Data

(63) Continuation of application No. PCT/CN2020/070574, filed on Jan. 7, 2020.

(51) Int. Cl.
*H04W 28/06*    (2009.01)
*H04W 72/044*    (2023.01)

(52) U.S. Cl.
CPC .................................. *H04W 72/044* (2013.01)

(58) Field of Classification Search
CPC .. H04L 5/0053; H04L 5/0094; H04W 72/044; H04W 72/20
See application file for complete search history.

(56) References Cited

U.S. PATENT DOCUMENTS

| | | | |
|---|---|---|---|
| 8,830,855 B2 | 9/2014 | Kim et al. | |
| 10,284,485 B2* | 5/2019 | Turányi | H04L 47/629 |
| 10,326,816 B2* | 6/2019 | Oh | H04N 21/64707 |
| 2010/0158042 A1* | 6/2010 | Yeh | H04N 21/23608 |
| | | | 370/465 |
| 2014/0269731 A1* | 9/2014 | DeCusatis | H04L 49/506 |
| | | | 370/394 |
| 2018/0132136 A1* | 5/2018 | Lu | H04W 72/0446 |
| 2018/0310276 A1 | 10/2018 | Zhang | |
| 2019/0029028 A1 | 1/2019 | Chae et al. | |

FOREIGN PATENT DOCUMENTS

| | | |
|---|---|---|
| CN | 106063350 A | 10/2016 |
| CN | 107210988 A | 9/2017 |
| CN | 110268788 A | 9/2019 |

(Continued)

OTHER PUBLICATIONS

Extended European Search Report on EP Appl No. 20887599.7, dated Jul. 17, 2023 (8 pages).

(Continued)

*Primary Examiner* — Phuc H Tran
(74) *Attorney, Agent, or Firm* — Foley & Lardner LLP

(57) ABSTRACT

A system and method for sending data are disclosed herein. In one embodiment, a method performed by a wireless communication device includes generating, by a wireless communication device, a plurality of packets to be transmitted via a plurality of resource positions in frequency domain and time domain. The method includes transmitting, by the wireless communication device, each of the plurality of packets with information indicative of at least a resource position of another of the plurality of packets.

20 Claims, 18 Drawing Sheets

(56) References Cited

FOREIGN PATENT DOCUMENTS

| CN | 110474729 | 11/2019 | | |
|---|---|---|---|---|
| KR | 1020160138460 A | 12/2016 | | |
| WO | WO-2019/028879 A1 | 2/2019 | | |
| WO | WO-2019153853 A1 * | 8/2019 | ........... | H04L 5/0048 |

OTHER PUBLICATIONS

First Exam Report on Indian Patent Appln. No. 202227038500, dated Mar. 29, 2023 (5 pages).
International Search Report and Written Opinion for PCT Appl. No. PCT/CN2020/070574, mailed Sep. 27, 2020 (7 pages).
NTT DOCOMO, Inc. (Rapporteur), "RAN WG's progress on NR technology SI in the October meeting" 3GPP TSG-RAN WG2 #96, R2-168015, Nov. 18, 2016, Reno, USA (30 pages).
NTT DOCOMO, Inc., "Discussion on initial access design for NR" 3GPP TSG RAN WG1 Meeting #86bis, R1-1610073, Oct. 14, 2016, Lisbon, Portugal (7 pages).
Ericsson, "System Level Simulation Results of Potential PC5 Design Options for V2X", 3GPP TSG RAN WG1 Meeting #84, R1-161073, Feb. 19, 2016, Malta (7 pages).
First Office Action for CN Appl. No. 202080092497.8, dated Feb. 28, 2025 (with English translation, 14 pages).
LG Electronics, "Control design for D2D broadcast communication", 3GPP TSG RAN WG1 Meeting #77, R1-142146, May 23, 2014, Seoul, Korea (7 pages).
Office Action for KR Appl. No. 10-2022-7023342, dated Feb. 24, 2025 (with English translation, 7 pages).

* cited by examiner

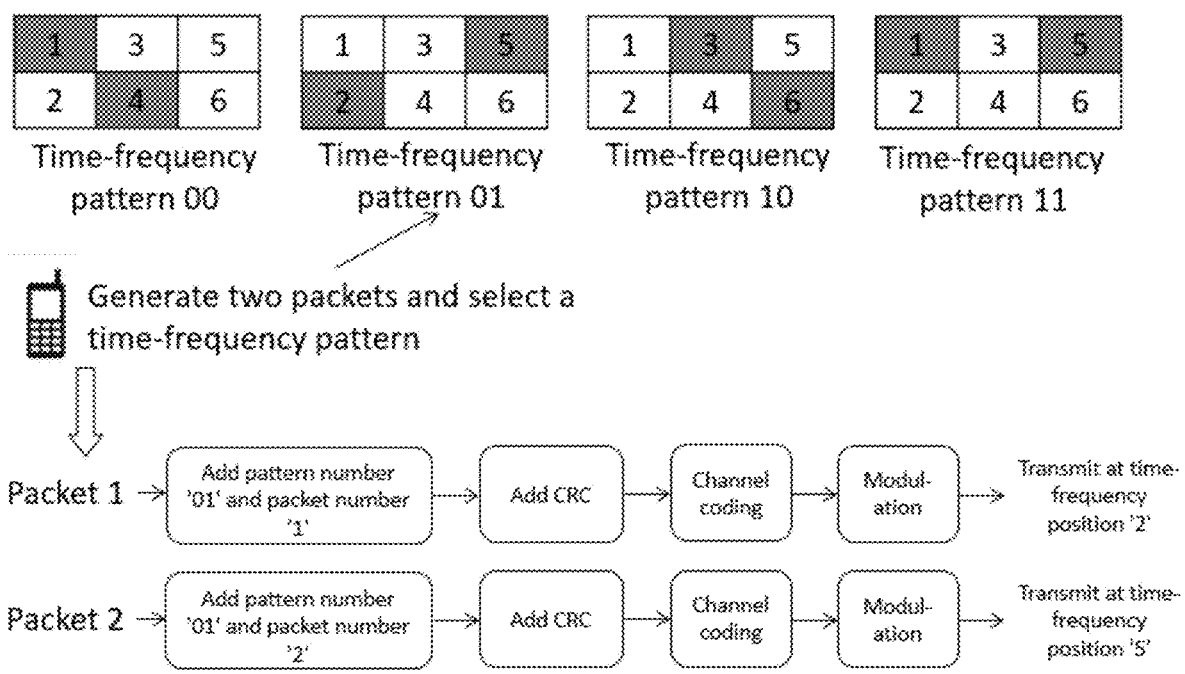

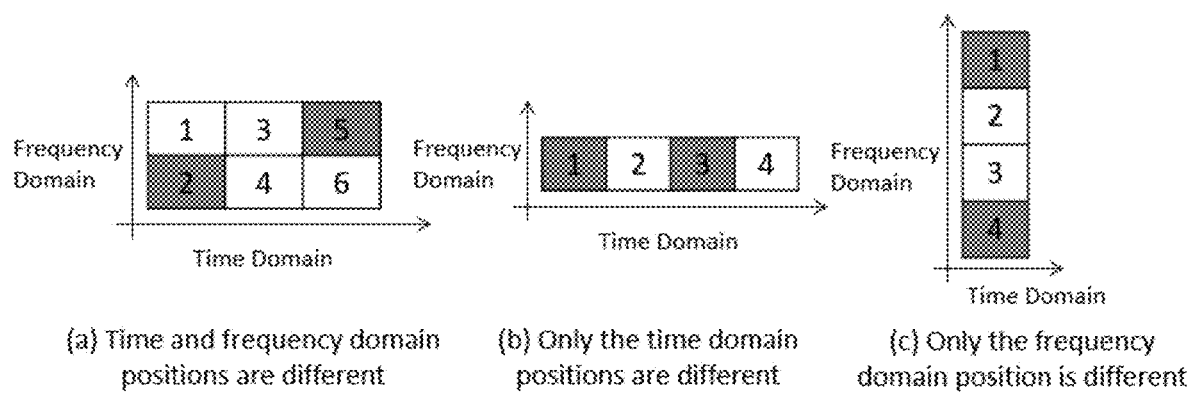

Figure 9B
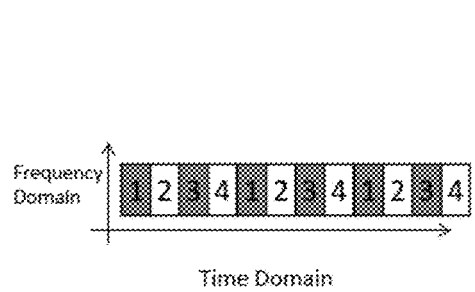
(a) Discontinuities in time domain
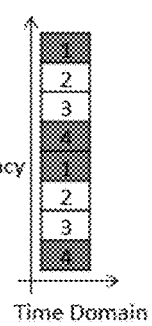
(b) Discontinuities in the frequency domain
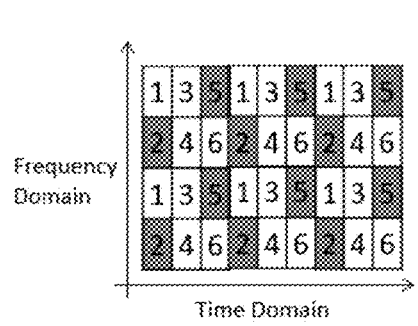
(c) Discontinuities in both time and frequency domains

SYSTEM AND METHOD FOR SENDING DATA

CROSS-REFERENCE TO RELATED APPLICATION

This application claims the benefit of priority under 35 U.S.C. § 120 as a continuation of PCT Patent Application No. PCT/CN2020/070574, filed on Jan. 7, 2020, the disclosure of which is incorporated herein by reference in its entirety.

TECHNICAL FIELD

The disclosure relates generally to wireless communications and, more particularly, to systems and methods for sending data.

BACKGROUND

In a communication system, a demodulation capability of the receiver when there is no channel information is weaker than the demodulation capability when there is channel information, and a demodulation difficulty of the signal received at different times can be random.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a method performed by a wireless communication device includes generating, by a wireless communication device, a plurality of packets to be transmitted via a plurality of resource positions in frequency domain and time domain. The method includes transmitting, by the wireless communication device, each of the plurality of packets with information indicative of at least a resource position of another of the plurality of packets, in one or more embodiments.

In certain embodiments, a method performed by a wireless communication node includes receiving, by a wireless communication node, a plurality of packets via a plurality of channels each corresponding to a resource position in frequency domain and time domain. The method includes receiving, by the wireless communication node, with each of the plurality of packets, information indicative of at least a resource position of another of the plurality of packets, in one or more embodiments.

In some embodiments, an apparatus includes one or more processors and a memory storing executable instructions. The instructions, upon execution by the one or more processors, can cause the one or more processors to generate a plurality of packets to be transmitted via a plurality of resource positions in frequency domain and time domain. The instructions, upon execution by the one or more processors, can cause the one or more processors to transmit each of the plurality of packets with information indicative of at least a resource position of another of the plurality of packets.

In certain embodiments, an apparatus includes one or more processors and a memory storing executable instructions. The instructions, upon execution by the one or more processors, can cause the one or more processors to receive a plurality of packets via a plurality of channels each corresponding to a resource position in frequency domain and time domain. The instructions, upon execution by the one or more processors, can cause the one or more processors to receive, with each of the plurality of packets, information indicative of at least a resource position of another of the plurality of packets.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 8 illustrates an approach for transmission of position information, in accordance with some embodiments of the present disclosure.

FIG. 9A illustrates a block diagram of various positional relationships of M transmission packets in different time-frequency transmission positions, in accordance with embodiments of the present disclosure.

FIG. 9B illustrates a block diagram of various positional relationships of M transmission packets in different time-frequency transmission positions, in accordance with embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
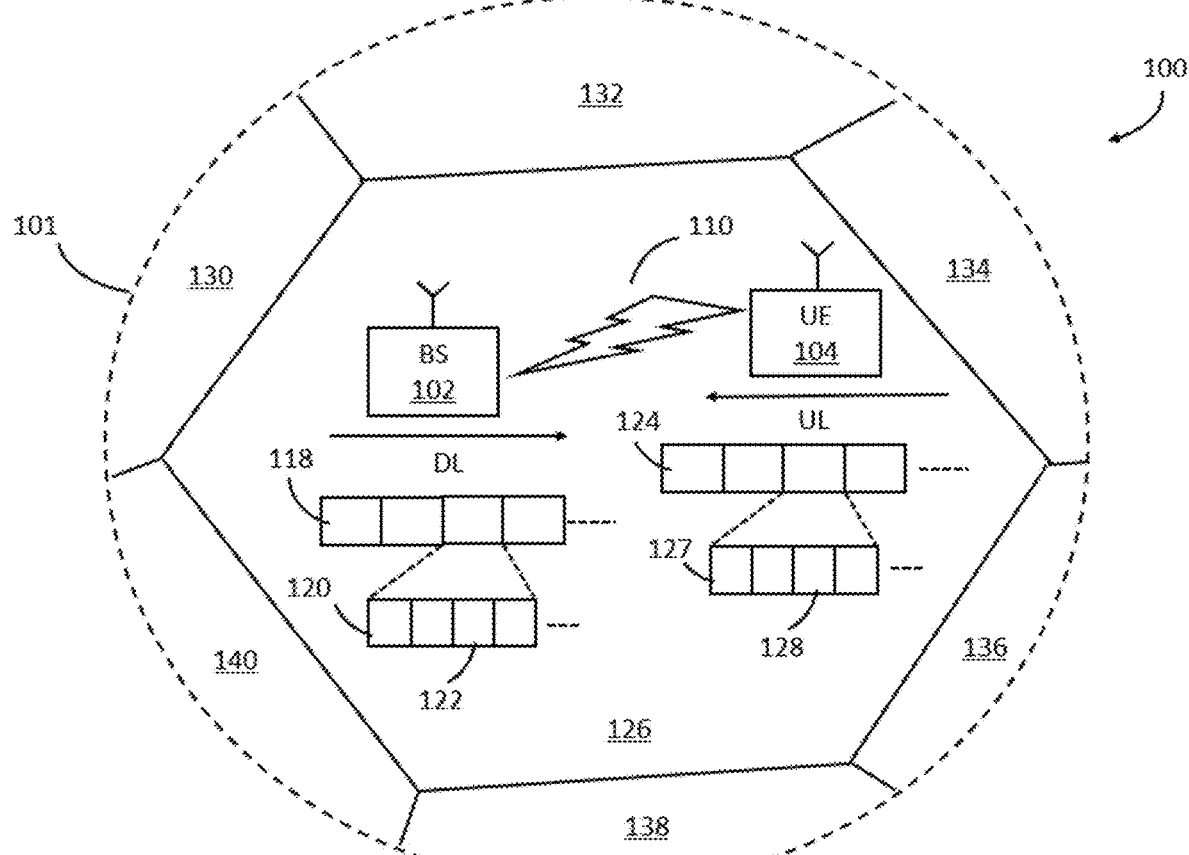
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
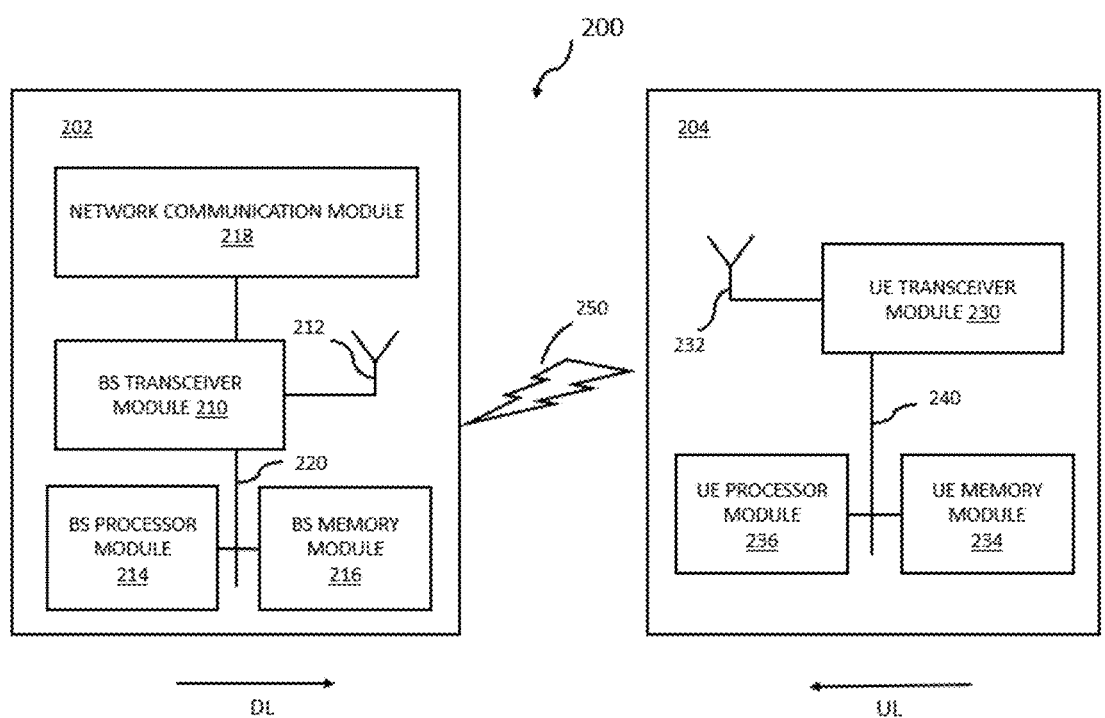
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Sending Data

In a communication system, a demodulation capability of the receiver when there is no channel information is weaker than the demodulation capability when there is channel information, and a demodulation difficulty of the signal received at different times can be random. Conventional systems and methods that demodulate without knowledge of channel information can only demodulate received signals having a lower demodulation difficulty.

The disclosure specifies a transmitting and receiving system and method. A receiving terminal can perform demodulation without channel information, demodulate a portion of a signal(s), obtain channel information through the demodulated portion, and/or use the obtained channel information to perform demodulation at associated time-frequency (transmission resource) positions, thereby improving overall performance of the system.

The present disclosure is directed to a massive machine type communication (mMTC) service, in some embodiments. A large number of users can be active at a very low probability and transmit a shorter data packet (e.g., sporadic transmission). For sporadic transmission of a large number of users, a scheduling transmission method based on signaling interaction causes signaling overhead and greatly reduces the transmission efficiency. A grant-free transmission method with pre-configured pilots (or pilot frequencies) causes pilot configuration of a large number of users, pilot updates caused by cell switching, and pilot interference between cells. Therefore, a grant-free transmission method without pre-configuration, sometimes referred to as uncoordinated transmission, is desired or advantageous.

When a number of receiving antennas is small, the traditional uncoordinated transmission receiver can approach performance levels equivalent to performance under ideal channel estimation. However, when the number of antennas is increased, the performance of traditional receivers (when receiver complexity is limited) can be significantly worse than that of ideal channel estimation. Thus, a number of users supported by the traditional uncoordinated transmission receiver is significantly less than the number of users that can be supported using ideal channel estimation. That is, in an absence of channel information, a capability of spatial multiplexing cannot be fully utilized.

In uncoordinated transmission, a number of users arriving at any time is random, and inter-user interference at any time is random. The inter-user interference is caused by the correlation between resources selected by the user. The resources include, but are not limited to, pilot resources, frequency domain resources, and code domain resources. As the number of users increases, the inter-user interference increases. The randomness of the number of users and the randomness of the inter-user interference can cause performance of the receiver to be different at different times. A technical challenge is to maintain a uniform performance over time in presence of (or while subject to) the randomness. The present disclosure proposes a new mechanism or transmission method that, in some embodiments, adds position indications of one or more other transmission packets to a transmission packet to improve the overall transmission performance.

A terminal (e.g., a terminal, a wireless communication device, a user equipment device, a UE, the UE 104, the UE 204, a mobile device, a mobile phone, etc.) sends M transmission packets within a time-frequency window, in certain embodiments. In some embodiments, the M transmission packets are sent to a BS (e.g., a BS, a base station, the BS 102, the BS 204, a network, a gNB, a wireless communication node, a node, and the like). Each (e.g., each, a current) transmission packet includes, but is not limited to, a combination or partial combination of: a user identifier (ID), data, cyclic redundancy check (CRC), and position information (e.g., time-frequency resource locations) of a remaining (e.g., remaining, other) (M−1) transmission packets of the M transmission packets.

The position information of the remaining (M−1) transmission packets can be indicated by at least one dedicated/special symbol or can be obtained by mapping/translating the transmission packets. The mapping/translating includes, but is not limited to arithmetic operations, logic operations, modulo two operations, modulo operations, remainder operations, or a combination thereof.

The time-frequency (e.g., time, frequency, or both) window of different users may be asynchronous (e.g., not synchronized in time and/or frequency) or can be synchronized. For asynchronous embodiments, the time-frequency position information of the remaining (M−1) transmission packets includes, but is not limited to indicating (e.g., indicating, using indications of, specifying, identifying, determining, detecting, deciding, etc.) positional offsets (e.g., relative positions) of the remaining transmission packets from the current transmission packet, specifying time-frequency patterns that are indicated by the pattern number and/or transmission number of the current packet, and/or specifying a time-frequency pattern that is indicated by the current transmission packet number. For synchronous embodiments, the position information of the remaining (M−1) transmission packets includes, but is not limited to, information indicating positional offset(s) of one or more other transmission packets from the current transmission packet and/or specifying time-frequency pattern(s) that is/are indicated by pattern number(s).

The time-frequency position of each transmission packet may be continuous or discontinuous. Discontinuous methods include but are not limited to time-domain interleaving and frequency-domain interleaving.

Figure 3A:
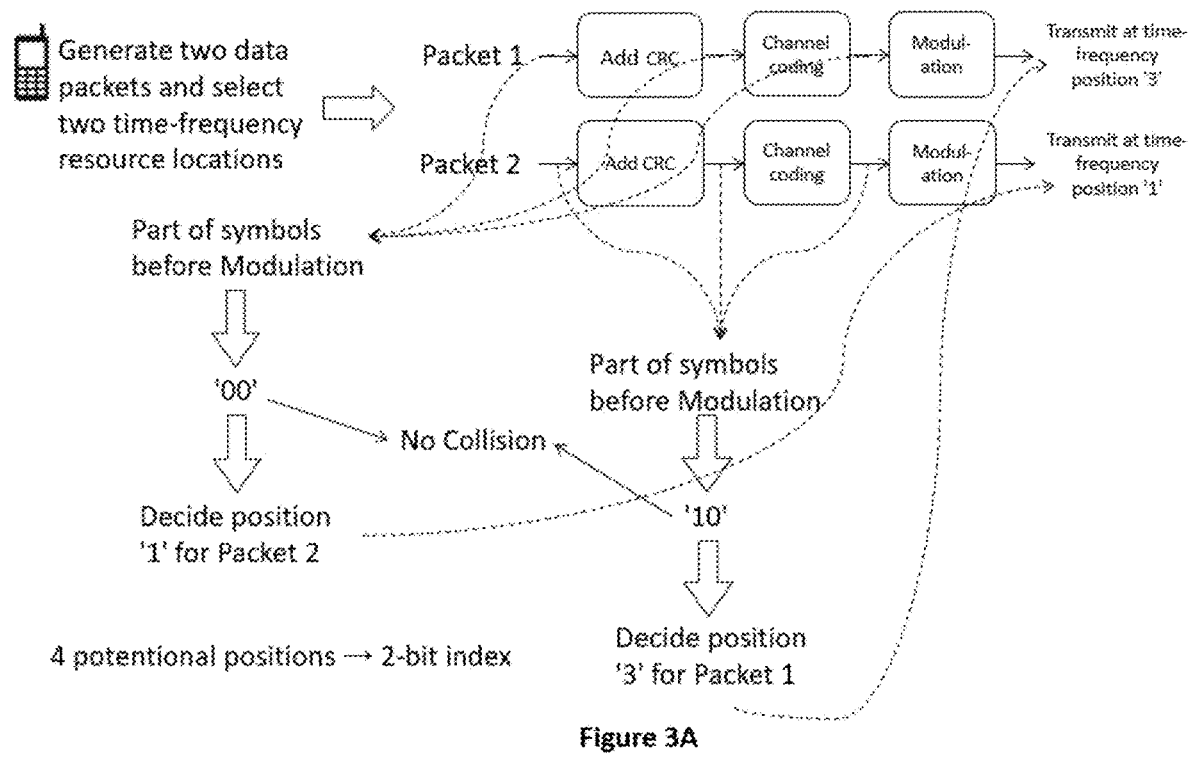
FIG. 3A illustrates an approach for transmission of position information, in accordance with some embodiments of the present disclosure.

FIG. 3A illustrates an approach for transmission of position information, in accordance with some embodiments of the present disclosure. A transmitter (e.g., the UE or the BS) can generate a packet (e.g., packet 1), add a CRC to the packet, perform channel coding on the packet, modulate the packet, incorporate (e.g., incorporate as bits of the packet, assign, allocate, etc.) position information (e.g., bits that map to a positions of remaining packets (e.g., packet 2)), and/or transmit the packet. The transmitter can incorporate the position information before adding CRC, between adding CRC and channel encoding, and/or between channel encoding and modulating the packet. The transmitter can incorporate (e.g., specify, configure) the position information using (e.g., by selecting, encoding, translating and/or mapping) one or a combination of one or more data symbols yet to be modulated.

A wireless communication device generates a plurality of packets to be transmitted via a plurality of resource positions in frequency domain and time domain, which may be represented as a time-frequency (resource) pattern. The time-frequency pattern (of a resource window in time and frequency domains) can be based on time-frequency division, time division or frequency division. The resource window can occupy a certain amount of time domain resource and frequency domain resource. The time-frequency pattern can be represented by or segmented into (time-frequency) slots, each of which can occupy or correspond to a portion of the time domain resource and frequency domain resource of the resource window. Hence, each slot can include a particular amount of time-frequency resources. The wireless communication device can transmit a packet in or at a slot (e.g., using resources of that slot), which is sometimes referenced as a resource position. The size of a slot (or resource position) can be determined by a size of the packet, wherein the packet occupies a specific amount of time resources (or time slot) and a specific amount of frequency resources (or frequency slot). The wireless communication device transmits each of the plurality of packets with information indicative of at least a resource position of another of the plurality of packets. In some embodiments, resource positions of two of the plurality of packets correspond to a same slot in time domain or a same slot in frequency domain, or correspond to different slots in the time domain and different slots in the frequency domain. The information can include information for determining the resource position of the another of the plurality of packets. In some embodiments, the wireless communication device incorporates, into a first packet of the plurality of packets, information indicative of a resource position of a second packet of the plurality of packets. The wireless communication device can transmit a first packet of the plurality of packets, via a resource position of the first packet. In some embodiments, the information indicative of the resource position of the another packet is obtainable from information provided with at least one other packet of the plurality of packets, using a mapping or decoding operation.

In some embodiments, the position information is assigned (via a particular method, manner or approach) as one or more bits in a predetermined position in the packet (e.g., in a header or payload portion of the packet). For example, the position information can be assigned as a first two bits of the packet. As shown in FIG. 3A, the position information for the packet 2 are assigned as the first bits in the packet 1, having a value '00,' and the position information for the packet 1 are assigned as the first bits in the packet 2, having a value '10.' In some embodiments, the assigned bits are already conveying other information. Thus, the value of the bits (or data symbols, selected via certain methods or approaches) to convey position information, may be somewhat random or unpredictable, and may result in a potential collision as discussed below. Some other methods or approaches may use data symbol(s) in a manner that avoid such randomness, and hence avoid such collisions.

The transmitter may decide, based on a mapping of the bits to a position, a position of the remaining packets. Thus, based on the mapping and the value '00' of the assigned bits in the packet 1, the transmitter decides in the example scenario that the packet 2's position is '1' (e.g., in a particular time-frequency pattern). Likewise, based on the mapping and the value '10' of the assigned bits in the packet 2, the transmitter in the example scenario decides that the packet 1's position is '3.' The transmitter detects whether there is a collision (e.g., whether a value of the assigned bits in the packet 1 is same as a value of the assigned bits in the packet 2). As shown in FIG. 3A, the transmitter detects that there is no collision because the value of the bits '00' for the packet 1 is different from the value of the bits '10' for the packet 2. In some embodiments, if there is no collision, the transmitter transmits each packet in its decided position. In some embodiments, the value of the position information is generated/selected deterministically (e.g., not randomly) such that a collision is always avoided.

Figure 3B:
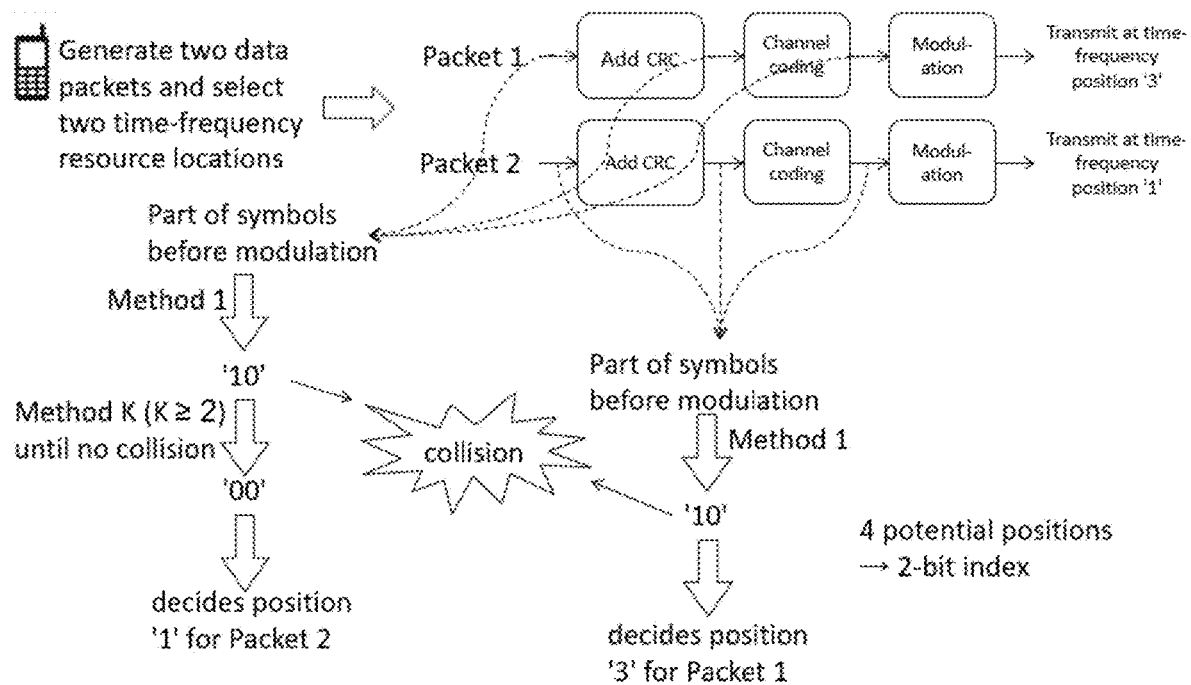
FIG. 3B illustrates an approach for transmission of position information, in accordance with some embodiments of the present disclosure.

FIG. 3B illustrates an approach for transmission of position information, in accordance with some embodiments of the present disclosure. As shown in FIG. 3B, both of the first two bits in the packet 1 and the first two bits in the packet 2 (e.g., as assigned or selected from available data symbols by a first method or approach) have the value '10.' As shown in FIG. 3B, the transmitter detects that there is a collision because the transmitter detects that the first two bits in the packet 1 and the first two bits in the packet 2 have the value '10.' In some embodiments, if the transmitter detects that there is a collision, the position information is reassigned (e.g., using different data symbol(s) according to a second method or approach) as bits in a second predetermined position in the packet. The transmitter detects whether there is a collision based on the newly assigned bits. The process is repeated until the transmitter detects that there is no longer a collision. For example, upon collision detection, the position information is reassigned (using a different or alternative method or approach) as the third and fourth bits of the packet. As shown in FIG. 3B, the position information for the second packet is reassigned as the third and fourth bits in the packet 1, the transmitter determines that the third and fourth bits in the packet 1 have the value '00,' and the transmitter detects that there is no collision because the value '00' of the third and fourth bits in the packet 1 is different from the value '10' of the first two bits in the packet 2. In some embodiments, the wireless communication device selects a method (e.g., one of a plurality of methods) for generating the information indicative of the resource position of the another packet, using data symbols yet to be modulated for the at least one other packet. Such data symbols (available prior to the modulation step) may be selected or generated (via one or more methods) from (1) data symbols available or generated before the step of adding CRC, (2) data symbols available or generated between the steps of adding CRC and channel coding, and/or (3) data symbols available or generated after the step of channel coding. The one or more methods for selecting and/or generating the data symbols may be independent of the methods/steps of adding CRC and/or channel coding.

Figure 3C:
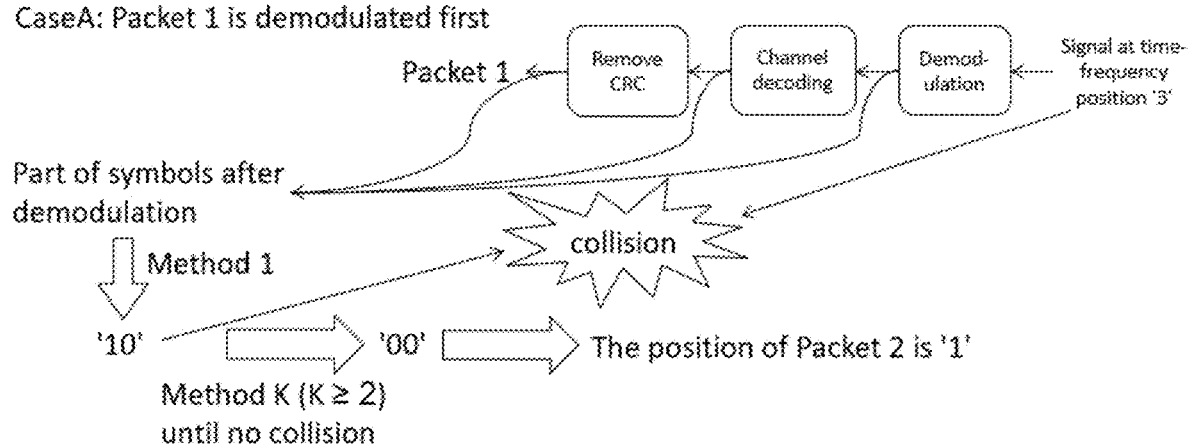
FIG. 3C illustrates an approach for reception of position information, in accordance with some embodiments of the present disclosure.

FIG. 3C illustrates an approach for reception of position information, in accordance with some embodiments of the present disclosure. The receiver (e.g., a UE or a BS) demodulates the packet sent by the transmitter, performs channel decoding on the packet, removes the CRC, and identify the position of the remaining packets. The receiver can identify the position between demodulating the packet and decoding the packet, between decoding the packet and removing the CRC, or after removing the CRC. As shown in FIG. 3C, the receiver identifies that the first two bits in the packet 1 have a value '10.' The receiver detects that there is a collision because the receiver maps the value '10' to a same position as a position of the packet 1. The receiver identifies that the third and fourth bits in the packet have a value '00.' The receiver detects that there is no collision because the receiver maps the value '00' to a different position than the position of the packet 1. As shown in FIG. 3C, the receiver identifies, by mapping the value '00' to a position, that a position at which the packet 2 is to be received is '1.'

Figure 3D:
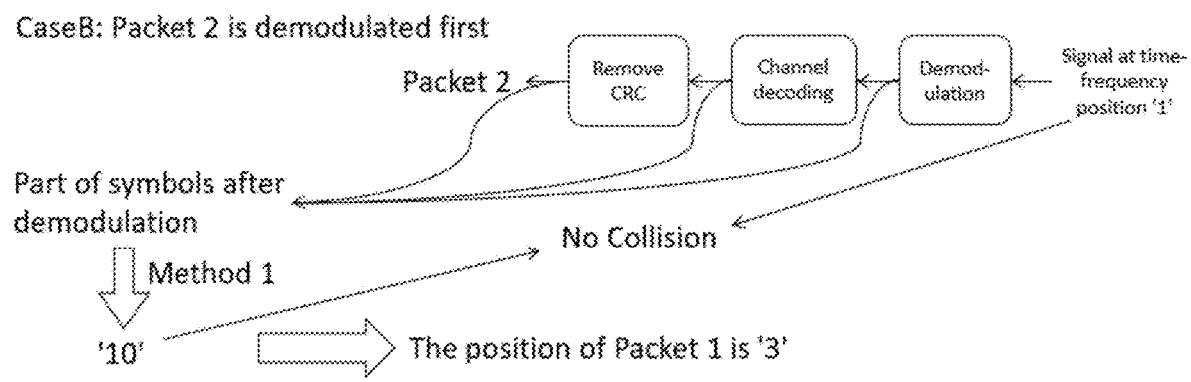
FIG. 3D illustrates an approach for reception of position information, in accordance with some embodiments of the present disclosure.

FIG. 3D illustrates an approach for reception of position information, in accordance with some embodiments of the present disclosure. As shown in FIG. 3C, the receiver identifies that the first two bits in the packet 2 have a value '10.' The receiver detects that there is no collision because the receiver maps the value '10' to a different position than the position of the packet 2. As shown in FIG. 3C, the receiver identifies, by mapping the value '10' to a position, that a position at which the packet 1 is to be received is '3.'

Figure 4:
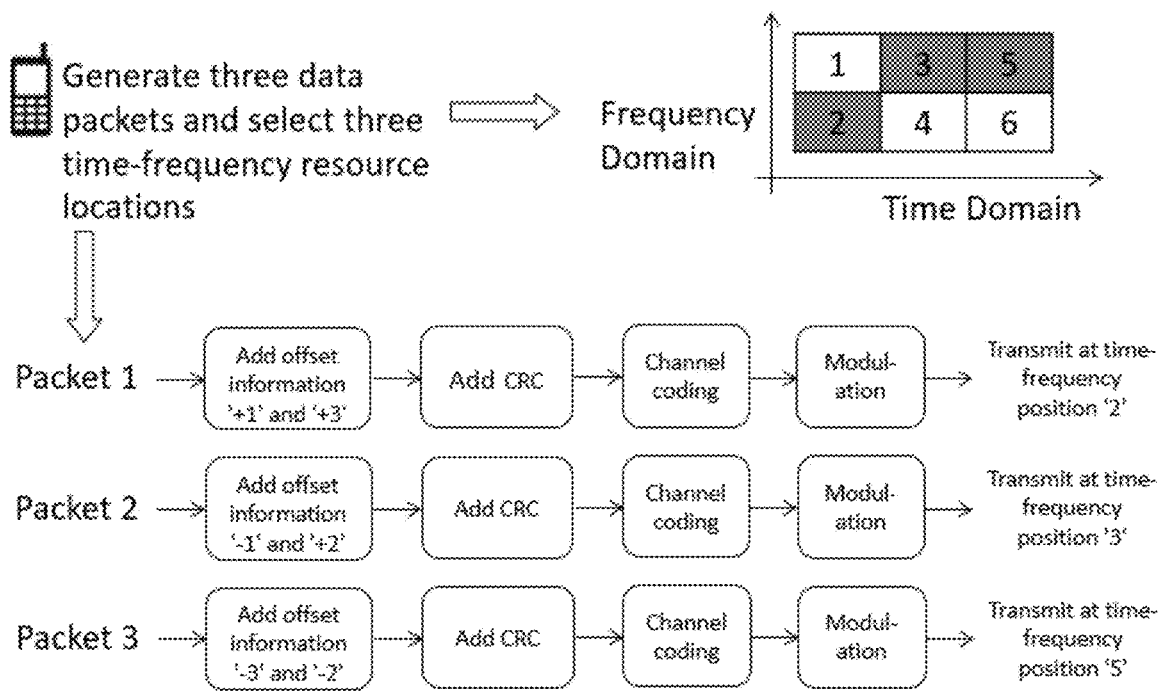
FIG. 4 illustrates an approach for transmission of position information, in accordance with some embodiments of the present disclosure.

FIG. 4 illustrates an approach for transmission of position information, in accordance with some embodiments of the present disclosure. The terminal transmits M (e.g., 3) transmission packets (e.g., the packet 1, the packet 2, and the packet 3) on different time-frequency resources, and each transmission packet includes a corresponding data packet, CRC, and position information of one or more other transmission packets. In some embodiments, the position information includes offset information. For example, the packet 1 includes the offset information '+1' and '+3,' the packet 2 includes the offset information '−1' and '+2,' the packet 3 includes the offset information '−3' and '−2.' In some embodiments, the wireless communication device can incorporate into a first packet of the plurality of packets, the information indicative of the resource position of the another packet, prior to incorporating information on cyclic redundancy check into the first packet.

The receiver determines the position of the other packets based on the offset information included in the current packet. Because a synchronization window (e.g., a time and frequency absolute reference point) is present and shared between the packets, where time-frequency positions 1-6 are deterministically known and related, an offset value can clearly describe the positional relationship between two packets. For example, the receiver can determine that the time-frequency position of the packet 2 is '3' and the time-frequency position of the packet 3 is '5' based on identifying the offset information and knowing that it has received the packet 1 at time-frequency position '2.'

Figure 5:
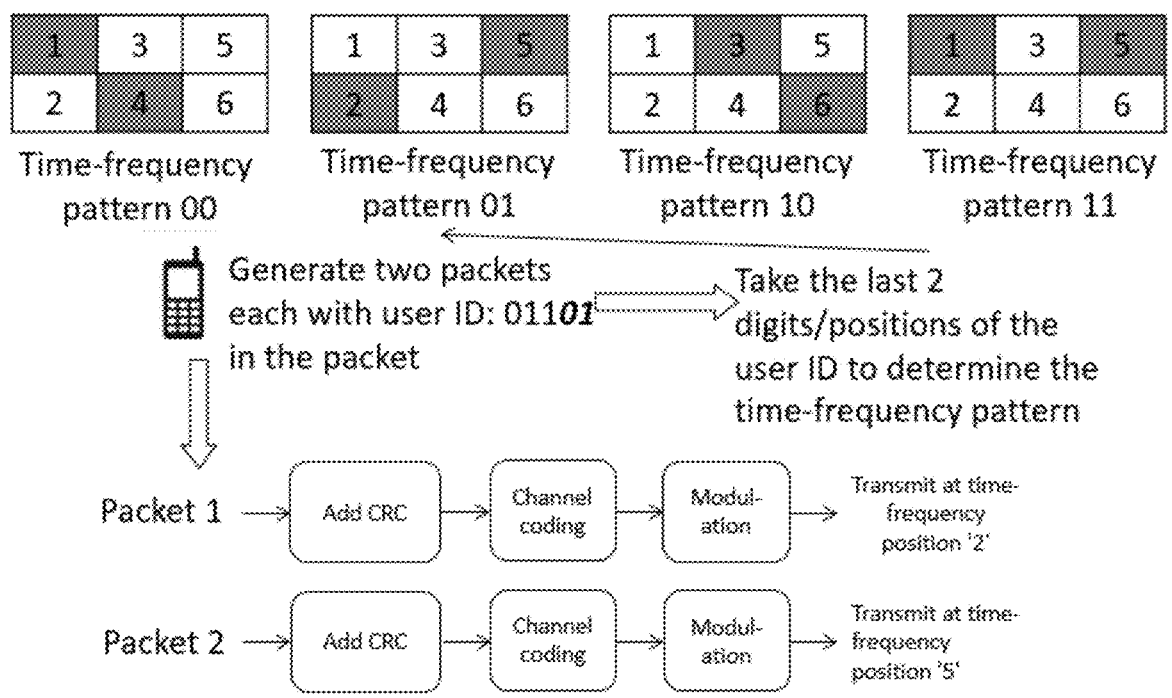
FIG. 5 illustrates an approach for transmission of a transmission of position information, in accordance with some embodiments of the present disclosure.

FIG. 5 illustrates an approach for transmission of position information, in accordance with some embodiments of the present disclosure. A time-frequency pattern includes positions of some or all of the packets. A synchronization window of the time-frequency pattern is present and shared between the packets. The terminal transmits M (e.g., 2) transmission packets (e.g., the packet 1 and the packet 2) on different time-frequency resources (and/or slots), and each transmission packet includes a corresponding data packet and a CRC, and generates other transmission packet position information by mapping the time-frequency pattern to one or more digits (e.g., values or identifiers). The one or more digits can be part of (e.g., the last two bits of) a device (e.g., receiver, transmitter) identifier (ID). The receiver identifier can be transmitted with the packet (e.g., broadcasted or unicasted in a separate transmission before, during, or after the packet is transmitted, and can be performed wirelessly or via a wired connection). In some embodiments, the wireless communication device transmits a first packet of the plurality of packets with information indicative of a resource position of a second packet of the plurality of packets. The information can be indicative of the resource position of the second packet, and can include an offset between the resource position of the second packet and the resource position of the first packet. The information indicative of the resource position of the another packet can be at least partially included or encoded in a user identifier, for example.

In some embodiments, the receiver determines the time-frequency pattern based on the device ID that it received. The receiver can determine that a second time-frequency pattern is associated with a second packet based on determining the time-frequency pattern (that includes a first time-frequency position and a second time-frequency position) and can receive a first packet at the first time-frequency position. As shown in the example scheme of FIG. 5, the receiver receives the ID 01101, and takes the last 2 digits/positions of the user ID, '01,' to determine the time-frequency pattern that includes time-frequency positions '2' and '5.' The receiver can receive the packet 1 at time-frequency position '2,' and determine that the packet 2 is associated with the time-frequency position '5,' based on the packet 1's position and the (remaining) available position(s)/slot(s) in the time-frequency pattern.

Figure 6:
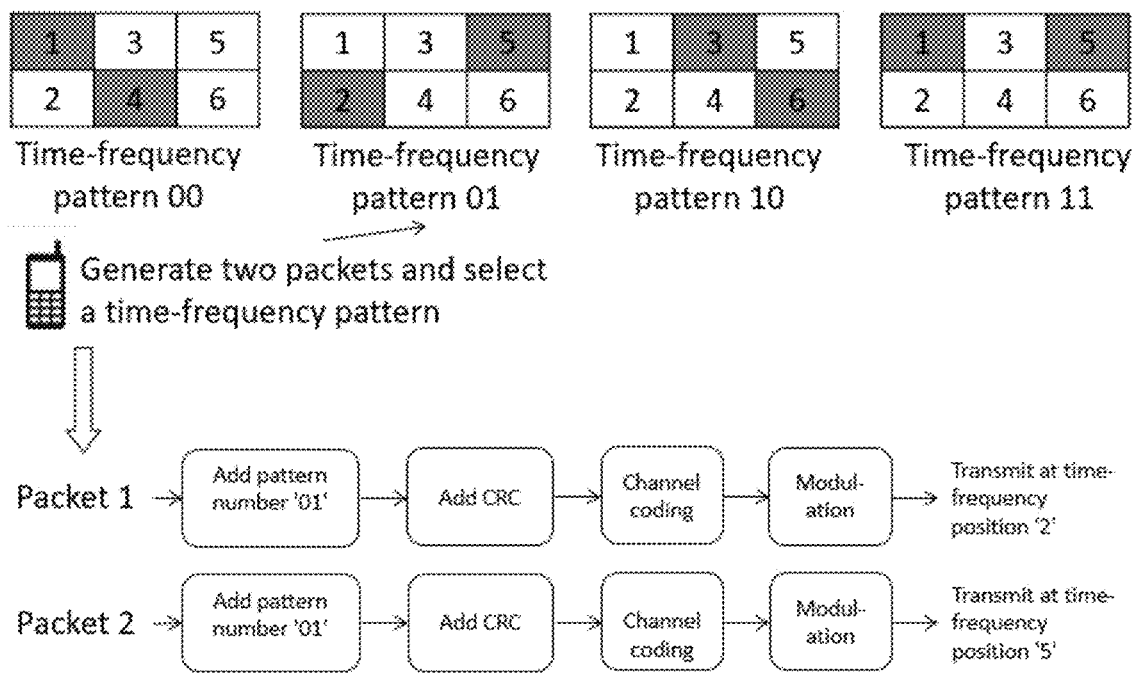
FIG. 6 illustrates an approach for transmission of position information, in accordance with some embodiments of the present disclosure.

FIG. 6 illustrates an approach for transmission of position information, in accordance with some embodiments of the present disclosure. The terminal transmits M transmission packets on different time-frequency resources, and each transmission packet includes a corresponding data packet, CRC, and position information of one or more other transmission packets. A frequency pattern synchronization window is present. At least one dedicated/special symbol can be used to specify the pattern "01" in a packet (instead of using the last two digits of user ID, or some arithmetic mapping to obtain the pattern identifier, for instance). The at least one dedicated/special symbol can be included in the packet (e.g., one of the M packets) instead of being transmitted in a separate packet. In some embodiments, the wireless communication device transmits the information indicative of the resource position of the second packet, in a transmission separate from a transmission of the first packet.

Figure 7:
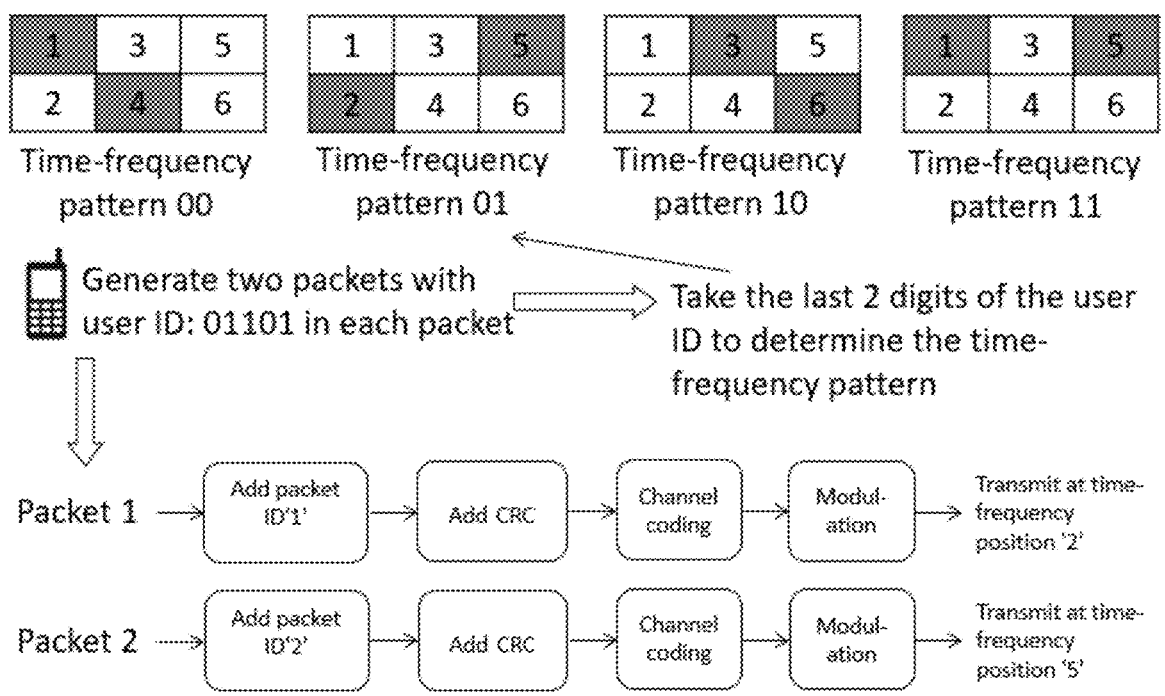
FIG. 7 illustrates an approach for transmission of position information, in accordance with some embodiments of the present disclosure.

FIG. 7 illustrates an approach for transmission of position information, in accordance with some embodiments of the present disclosure. The terminal transmits M transmission packets on different time-frequency resources, and each transmission packet includes a corresponding data packet, a CRC, and some other transmission packet position information. A mapping is used to generate position information of a remaining portion of other transport packets. There is no synchronization window for time-frequency patterns. Like the approach of FIG. 6, position information can include one or more digits that is a part of (e.g., the last two bits of) a user ID or other type of shared information. The user ID for instance, can be transmitted with the packet (e.g., broadcasted or unicasted in a separate transmission before, during, or after the packet is transmitted). At least one dedicated/special symbol included in the current packet can indicate the current packet's packet ID and/or which position in the time-frequency pattern (that is mapped to the user ID's bits) is associated with the current packet.

In some embodiments, the wireless communication device transmits a first packet of the plurality of packets, with information indicative of resource positions (e.g., position information, or slot position) of others of the plurality of packets. The information indicative of the resource position of the another packet can include an identification of a resource pattern (e.g., time-frequency pattern) that includes the resource position of the another packet. In some embodiments, the information indicative of the resource position of the another packet includes an identification of one of a plurality of resource patterns that includes the resource position of the another packet. The information indicative of the resource position of the another packet can include an identifier or transmission number of the another packet or one other packet of the plurality of packets.

Because no synchronization window (e.g., relative to a time-frequency pattern) is present and provided as a time-frequency reference between the transmissions of the packets, the packets can be transmitted asynchronously (e.g., in time and/or frequency). The receiver can receive packet 1, and can detect the time-frequency resource of packet 1, or the time-frequency position occupied by packet 1 as it is being received. The receiver can determine or figure out the specific time-frequency (or resource) pattern being used (e.g., via bits of the user ID), and can rely on the packet ID and/or detected time-frequency resource/position of packet 1 to identify a specific position of the packet 1 in the time-frequency pattern. The receiver can then determine a time-frequency reference (or specific boundary) for the time-frequency (or resource) pattern being used, relative to packet 1 (according to the time-frequency position occupied by packet 1). The receiver can then determine, deduce or predict a position/slot for packet 2 within the same time-frequency pattern, and/or relative to the time-frequency reference (or specific boundary) of the time-frequency pattern. Alternatively or additionally, the receiver can similarly rely on the packet ID of packet 2 to identify a specific position of the packet 2 in the same time-frequency pattern (and determine that position's relationship with respect to the position of the packet 1).

FIG. 8 illustrates an approach for transmission of position information, in accordance with some embodiments of the present disclosure. The terminal transmits M transmission packets on different time-frequency resources, and each transmission packet includes a corresponding data packet, CRC, and position information of one or more other transmission packets. There is no synchronization window for time-frequency patterns. In some embodiments, the current packet includes an indication of the time-frequency pattern number that is mapped to a time-frequency pattern. In some embodiments, the current packet includes an indication of a packet number that maps to one of the positions in the time-frequency pattern. In some embodiments, the time-frequency pattern number and/or the packet number can be broadcasted or predetermined.

FIG. 9A illustrates a block diagram of various positional relationships of M transmission packets in different time-frequency transmission positions, in accordance with embodiments of the present disclosure. For example, the time-frequency transmission positions can include multiple positions in the frequency domain and the time domain, one position in the frequency domain and multiple positions in the time domain, or multiple frequencies in the frequency domain and one position in the time domain. The M transmission packets are associated with M ones of the time-frequency transmission positions (or slots). In some scenarios, packets in positions 1 & 4 (for example) may be separated further apart in frequency-time domain, and that may be more preferable for better isolation and/or reduced interference or signal-to-noise ratio (e.g., b may be more preferable than a).

FIG. 9B illustrates a block diagram of various positional relationships of M transmission packets in different time-frequency transmission positions, in accordance with embodiments of the present disclosure. As shown in FIG. 9B, the time-frequency positions occupied by each transmission packet may not be continuous. Each packet may be separated into multiple portions (or transmissions) and transmitted across different time-frequency positions. (e.g., packet 1 is separated into 3 portions in (a)). In some embodiments, a transmission of a packet may be repeated at different time-frequency positions.

Figure 10:
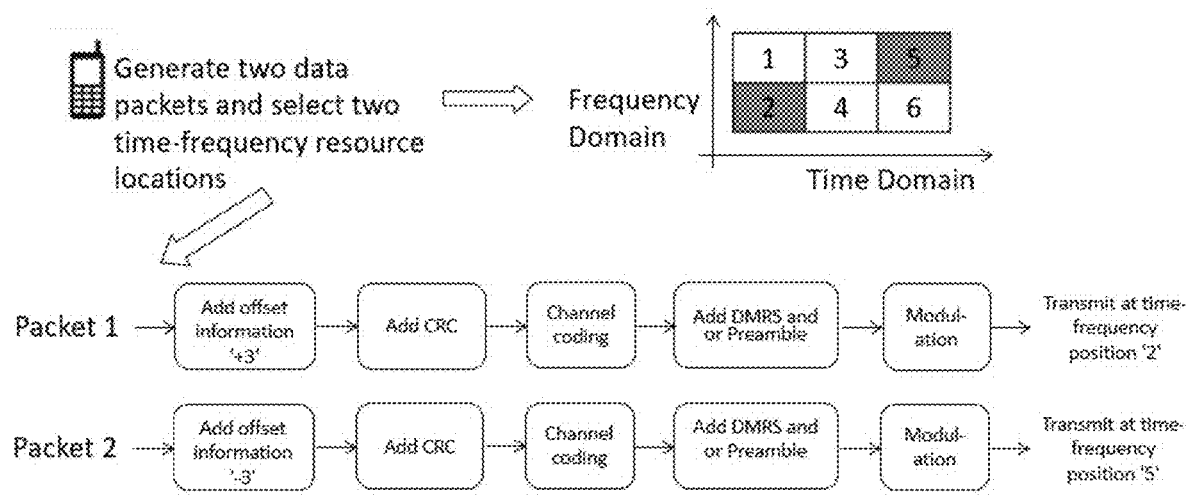
FIG. 10 illustrates an approach for transmission of position information, in accordance with some embodiments of the present disclosure.

FIG. 10 illustrates an approach for transmission of position information, in accordance with some embodiments of the present disclosure. A demodulation reference signal (DMRS) or preamble information can include information that can help a receiver inspect or process the received packet (e.g., more efficiently, accurately). (That information in packet 1 may or may not help in the demodulation of packet 2). The DMRS or preamble info can be added or incorporated into a packet between the steps/processes of adding the CRC and coding the packet. In some embodiments, the wireless communication device further incorporates into at least one of the plurality of packets, at least one of DMRS, preamble, code domain spread or partial scrambling information.

Figure 11A:
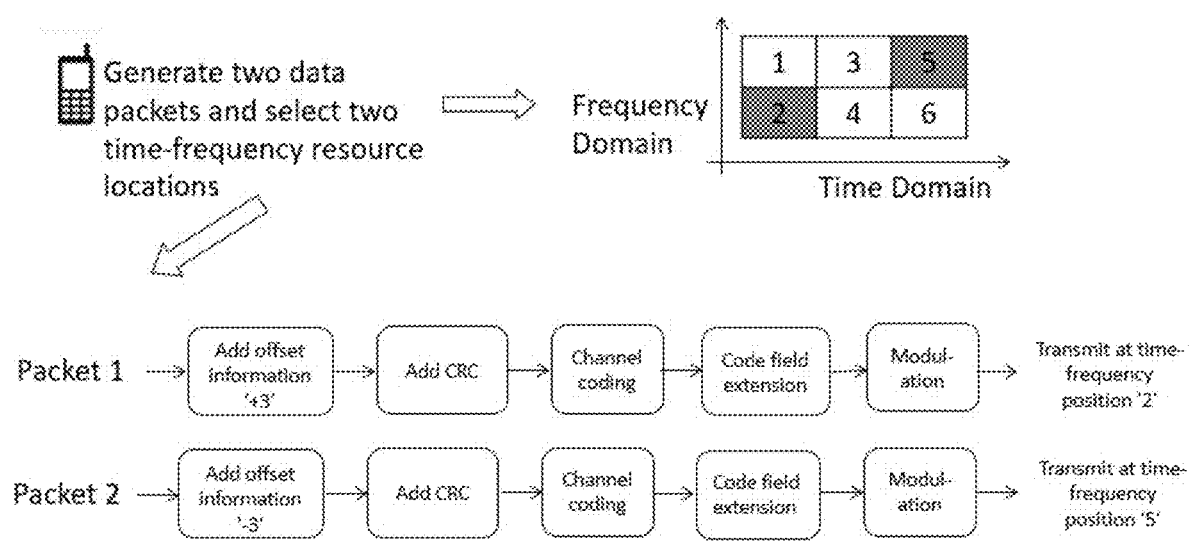
FIG. 11A illustrates an approach for transmission of position information, in accordance with some embodiments of the present disclosure.

FIG. 11A illustrates an approach for transmission of position information, in accordance with some embodiments of the present disclosure. Code field extension can include information that can help a receiver inspect or process the received packet. (That information in packet 1 may or may not help in the demodulation of packet 2). The code field extension info can be added or incorporated into a packet between the steps/processes of adding the CRC and coding the packet.

Figure 11B:
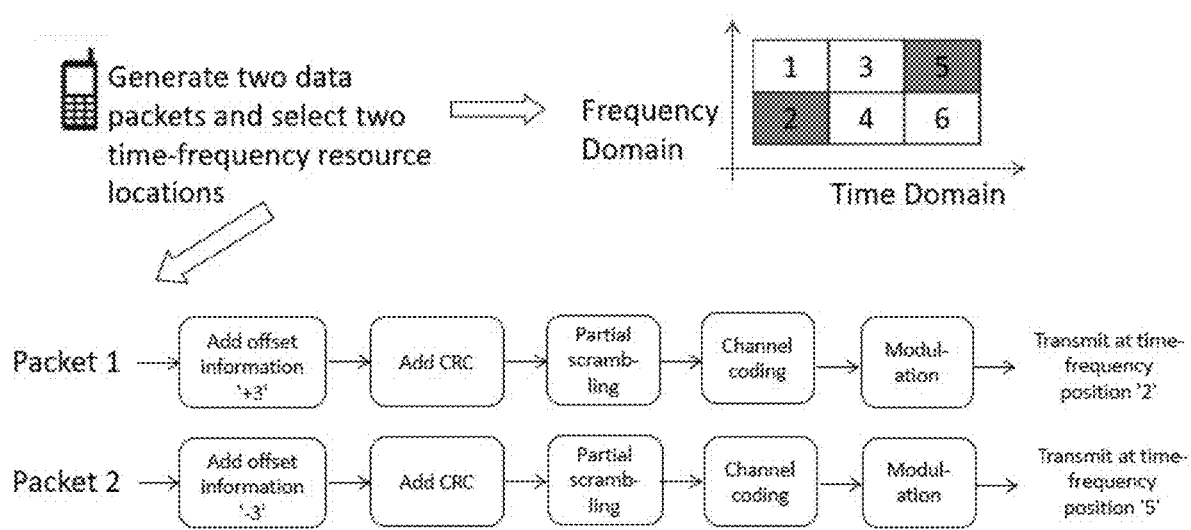
FIG. 11B illustrates an approach for transmission of position information, in accordance with some embodiments of the present disclosure.

FIG. 11B illustrates an approach for transmission of position information, in accordance with some embodiments of the present disclosure. Partial scrambling information can include information that can help receiver inspect or process the received packet. (That information in packet 1 may or may not help in the demodulation of packet 2). The partial scrambling information can be added between adding the CRC and coding the packet.

Figure 11C:
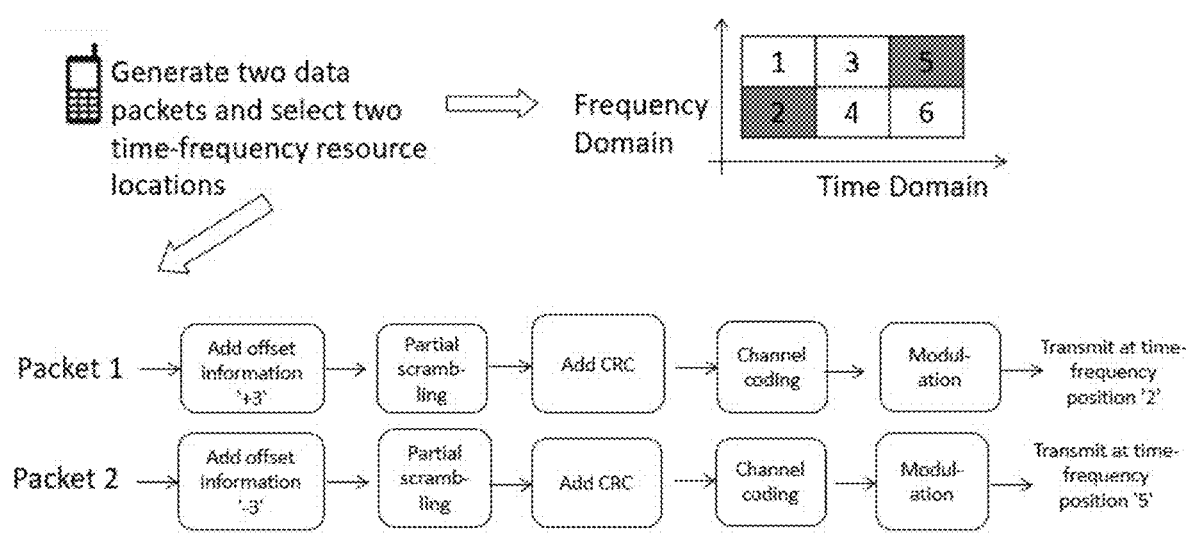
FIG. 11C illustrates an approach for transmission of position information, in accordance with some embodiments of the present disclosure.

FIG. 11C illustrates a block diagram of a transmission of position information, in accordance with some embodiments of the present disclosure. The block diagram of FIG. 11C is similar to the block diagram of FIG. 11B except that the partial scrambling info can be added or incorporated before adding the CRC.

Figure 12:
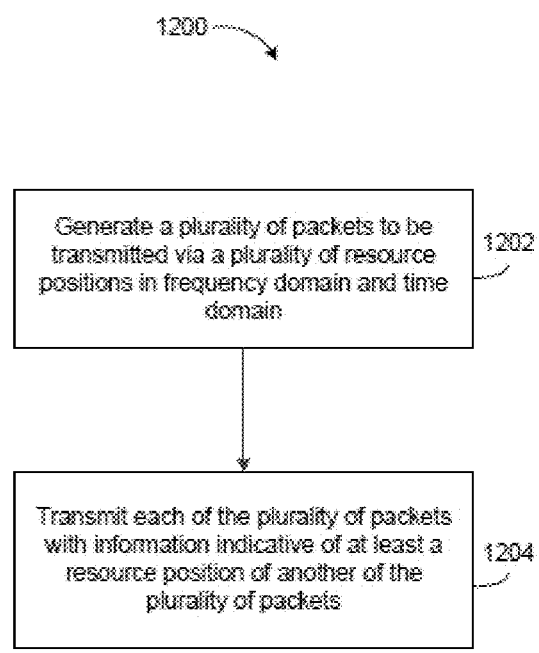
FIG. 12 illustrates a flowchart diagram illustrating a method of transmitting position information, in accordance with some embodiments of the present disclosure.

FIG. 12 illustrates a flowchart diagram illustrating a method 1200 of transmitting position information, in accordance with some embodiments of the present disclosure. Referring to FIGS. 1-11c, the method 1200 can be performed by the BS 102, the BS 202, the UE 104, and/or the UE 204, in some embodiments. Additional, fewer, or different operations may be performed in the method 1200 depending on the embodiment.

A wireless communication device, such as the BS 102 or UE 104, can generate a plurality of packets to be transmitted via a plurality of resource positions in frequency domain and time domain (1202). The wireless communication device can transmits at least one of (e.g., each of) the plurality of packets with information indicative of at least a resource position of another of the plurality of packets (1204). In some embodiments, the resource positions of two of the plurality of packets correspond to a same slot in time domain or a same slot in frequency domain, or correspond to different slots in the time domain and different slots in the frequency domain. In some embodiments, the information includes information for determining the resource position of the another of the plurality of packets.

In some embodiments, the wireless communication device incorporates into a first packet of the plurality of packets, information indicative of a resource position of a second packet of the plurality of packets. The wireless communication device can transmit a first packet of the plurality of packets, via a resource position of the first packet. In some embodiments, the wireless communication device transmits the information indicative of the resource position of the second packet, in a transmission separate from a transmission of the first packet. The wireless communication device can transmit a first packet of the plurality of packets, with information indicative of resource positions of others of the plurality of packets.

In some embodiments, the wireless communication device transmits a first packet of the plurality of packets with information indicative of a resource position of a second packet of the plurality of packets, wherein the information indicative of the resource position of the second packet comprises an offset between the resource position of the second packet and the resource position of the first packet. The information indicative of the resource position of the another packet can include an identification of a resource pattern that includes the resource position of the another packet. In some embodiments, the information indicative of the resource position of the another packet includes an identification of one of a plurality of resource patterns that includes the resource position of the another packet. The information indicative of the resource position of the another packet can be at least partially included or encoded in a user identifier.

In some embodiments, the information indicative of the resource position of the another packet is obtainable from information provided with at least one other packet of the plurality of packets, using a mapping or decoding operation. The wireless communication device can select a method for generating the information indicative of the resource position of the another packet, using data symbols yet to be modulated for the at least one other packet. In some embodiments, the information indicative of the resource position of the another packet includes an identifier or transmission number of the another packet or one other packet of the plurality of packets. The wireless communication device can incorporate into a first packet of the plurality of packets, the information indicative of the resource position of the another packet, prior to incorporating information on cyclic redundancy check into the first packet. In some embodiments, the wireless communication device further incorporates into at least one of the plurality of packets, at least one of demodulation reference signal (DMRS), preamble, code domain spread or partial scrambling information.

A wireless communication node, such as the BS 102 or UE 104, can receive a plurality of packets via a plurality of channels each corresponding to a resource position in frequency domain and time domain. The wireless communication node can for instance receive the first packet discussed above. The wireless communication node can receive with each of the plurality of packets, information indicative of at least a resource position of another of the plurality of packets. For instance, the wireless communication node can demodulate and/or process the first packet to obtain information indicative of a resource position of a second packet (e.g., yet to be received), wherein the second packet is from the plurality of packets. In some embodiment, the wireless communication node receives at least part of the information indicative of at least a resource position of another of the plurality of packets, via a mechanism or transmission (e.g., broadcast or unicast) separate from the transmission of the first packet.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   generating, by a wireless communication device, a plurality of packets to be transmitted via a plurality of resource positions in frequency domain and time domain;
   adding, by the wireless communication device, to each packet of the plurality of packets, a cyclic redundancy check (CRC) to the packet; and
   transmitting, by the wireless communication device, each of the plurality of packets, each of the plurality of packets including information indicative of at least a resource position of another of the plurality of packets, the information indicative of the resource position of the another packet being provided separately from the another packet.

2. The method of claim 1, wherein resource positions of two of the plurality of packets correspond to a same slot in the time domain or a same slot in the frequency domain or correspond to different slots in the time domain and different slots in the frequency domain.

3. The method of claim 1, wherein the information comprises information for determining the resource position of the another of the plurality of packets.

4. The method of claim 1, comprising incorporating, by the wireless communication device into a first packet of the plurality of packets, information indicative of a resource position of a second packet of the plurality of packets.

5. The method of claim 1, comprising transmitting, by the wireless communication device, a first packet of the plurality of packets, via a resource position of the first packet.

6. The method of claim 1, comprising transmitting, by the wireless communication device, the information indicative of the resource position of a second packet, in a transmission separate from a transmission of a first packet.

7. The method of claim 1, comprising transmitting, by the wireless communication device, a first packet of the plurality of packets, with information indicative of resource positions of others of the plurality of packets.

8. The method of claim 1, comprising transmitting, by the wireless communication device, a first packet of the plurality of packets with information indicative of a resource position of a second packet of the plurality of packets, wherein the information indicative of the resource position of the second packet comprises an offset between the resource position of the second packet and the resource position of the first packet.

9. The method of claim 1, wherein the information indicative of the resource position of the another packet comprises an identification of a resource pattern that includes the resource position of the another packet.

10. The method of claim 1, wherein the information indicative of the resource position of the another packet comprises an identification of one of a plurality of resource patterns that includes the resource position of the another packet.

11. The method of claim 1, wherein the information indicative of the resource position of the another packet, is at least partially included or encoded in a user identifier.

12. The method of claim 1, wherein the information indicative of the resource position of the another packet is obtainable from information provided with at least one other packet of the plurality of packets, using a mapping or decoding operation.

13. The method of claim 12, comprising selecting, by the wireless communication device, a method for generating the information indicative of the resource position of the another packet, using data symbols yet to be modulated for the at least one other packet.

14. The method of claim 1, wherein the information indicative of the resource position of the another packet comprises an identifier or transmission number of the another packet or one other packet of the plurality of packets.

15. The method of claim 1, comprising:
   incorporating into a first packet of the plurality of packets, the information indicative of the resource position of the another packet prior to incorporating information on cyclic redundancy check into the first packet, wherein the plurality of packets transmitted includes the first packet and the another packet.

16. The method of claim 1, comprising further incorporating into at least one of the plurality of packets, at least one of demodulation reference signal (DMRS), preamble, code domain spread or partial scrambling information.

17. A wireless communication device comprising:
   at least one processor configured to:
      generate a plurality of packets to be transmitted via a plurality of resource positions in frequency domain and time domain;
      add, to each packet of the plurality of packets, a cyclic redundancy check (CRC) to the packet; and
      transmit, via a transmitter, each of the plurality of packets, each of the plurality of packets including information indicative of at least a resource position of another of the plurality of packets, the information indicative of the resource position of the another packet being provided separately from the another packet.

18. The wireless communication device of claim 17, wherein resource positions of two of the plurality of packets correspond to a same slot in the time domain or a same slot in the frequency domain, or correspond to different slots in the time domain and different slots in the frequency domain.

19. The wireless communication device of claim 17, wherein the information comprises information for determining the resource position of the another of the plurality of packets.

20. The wireless communication device of claim 17, wherein the at least one processor is configured to incorporate into a first packet of the plurality of packets, information indicative of a resource position of a second packet of the plurality of packets, wherein the plurality of packets transmitted includes the first packet and the second packet.

* * * * *